ns of the central bore 39 arranged in the
United States Patent Office 3,507,455
Patented Apr. 21, 1970

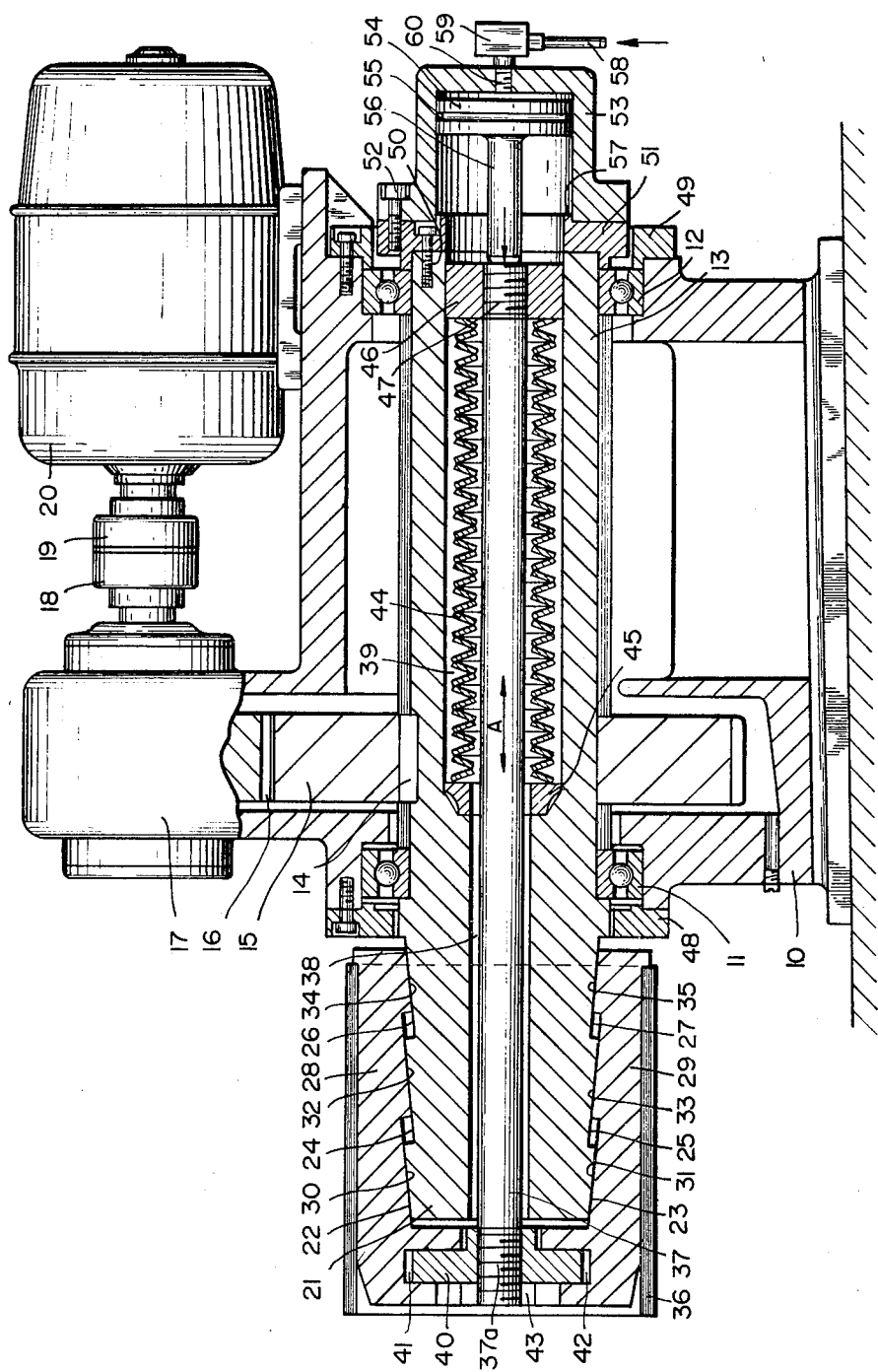

3,507,455
EXPANSIBLE MANDREL
Anders Sigvard Andersson, Vasteras, Sweden, assignor to Aktiebolaget Svenska Metallverken, Vasteras, Sweden
Filed Mar. 12, 1968, Ser. No. 712,507
Claims priority, application Sweden, Mar. 17, 1967
3,779/67
Int. Cl. B65h 75/24
U.S. Cl. 242—72.1          5 Claims

ABSTRACT OF THE DISCLOSURE

Expansible mandrel apparatus is provided having a main core member driven in rotation with an axially displaceable rod passing through the core member and connected to a mandrel formed by a plurality of segments having inclined cam surfaces coacting with complementary cam surfaces arranged on the core member. A spring bears against an abutment on the rod to urge the rod to a position in which the segments are moved radially outwards to expand the mandrel, and the rod can be moved axially against the action of the spring to contact the mandrel by the activation of a hydraulic cylinder arrangement.

---

The present inventon is concerned with an arrangement in expanding-type mandrels or winding heads of the type which essentially present a ring of segments axially displaceable on a rotatably mounted core provided with cam surfaces, the said segments being radially moved either towards the rotation axis of said core or away from the same depending upon the direction in which said ring is displaced.

Mandrels of this type are known, in which mutual axial displacement of the core and the segments is effected by means of hydraulic piston arrangements. In mandrels of this type it is necessary, for reasons of design, to maintain constant communication between the piston arrangement disposed in the core and an outer, stationary source of fluid pressure medium, in order to hold the segment ring in an expanded state during rotation of the winding head. However, such an arrangement requires complicated sealing means which are highly subjected to wear and must therefore be replaced relatively often. A drop in pressure from the desired level may result in accidents and damage to the machine since the segments cannot then be held in an expanded position and hence winding of the material is interrupted without there being time to cut off the supply of material to the winding head.

These disadvantages, however, are eliminated by the invention which is mainly characterized in that the segments are normally held in expanded position by an axially acting spring means which act in one axial direction and which is capable of being counteracted by means of a pressure piston capable of being loaded with a pressure medium at desired times and active in the opposite axial direction.

The invention will now be described in detail with reference to an example of the same shown diagrammatically in the accompanying drawing; additional characterizing features of the invention being disclosed in conjunction therewith.

The drawing shows substantially in vertical longitudinal section a winding apparatus together with correlated driving machinery according to the invention.

In the drawing the reference numeral 10 indicates generally a machine stand which rotatably supports in radial bearings 11 and 12 a core or winding shaft 13. Fixed to said shaft by means of keys or wedges 14 is a gear 15 which at 16 engages with a gear journaled in a a gear system generally indicated by the reference numeral 17. The gear system is driven by a mechanical coupling 18, 19 of known type by an electric motor 20 supported on the stand.

The core 13 presents an overhanging head member 21 which protrudes beyond the stand 10 and which is provided in a known manner with converging, planar cam surfaces 22, 23; 24, 25 and 26, 27.

Arranged in a ring extending peripherally around said core head 21 are a number of segments arranged displaceably in the axial direction of said core and of which only two, namely 28 and 29, are shown in the drawing. The segments, in turn, present pairs of mutually converging cam surfaces 30, 31; 32, 33; 34, 35, which abut cam surfaces on the core head 21. As is evident from the figure, upon displacement of the segments to the right as seen in the figure, the segments are urged outwardly as a result of the cooperation between the cam surfaces on the segments and on the core head, and arrive at a radially outer, so-called expanded position. The segments also support a cylindrical drum member 36 on which material is wound in a known manner. Although not shown in the drawing, the cylindrical drum may be provided with end flanges; e.g. when it is desired to coil wire-like material.

Although not shown in the drawing, the segments are secured at the core head 21 in a known manner and in such a way that said segments can move both axially and radially to a limited extent.

To provide for the axial displacement of the segments there is arranged an axially displaceable rod 37 which extends through the central portion of the core 13, 21 in bores 38 and 39. The front end of the rod 37 presents a threaded stud 37a on which is screwed a threaded plate 40 which extends into recesses 41 and 42 in the segments in such a manner that the flank surfaces of the recesses abut the plate 40, whereby the segments are jointly forced to effect an axial movement with rod 37 in the direction indicated by the double arrow A. A suitable lock nut 43 is provided for locking the plate 40 in position on the rod.

The dimensions of the central bore 39 arranged in the right-hand portion of the core 13 are greater than those of the bore 38 so that said bore 39 is able to accommodate a compression spring means 44 arranged on the rod 37. The spring means 44 acts against a reaction member 45 at the inner end of the bore 39 and against an abutment member 46 in the form of a plate screwed onto the right-hand threaded end 47 of the rod 37.

The radial bearings 11 and 12 are held in position by their respective seatings, comprising support rings 48 and 49 secured to the stand 10 by means of screws etc.

Arranged concentrically with the support ring 49 and presenting a clearance therebetween at the right-hand end of the core is a further support ring 51 securely fastened by a ring of bolts 50 and held urged against the internal ball race of the radial bearing 12. Secured at said support ring 51 by means of a ring of bolts 52 is a cap-forming pressure cylinder 53, containing a displaceable piston 54, provided with suitable sealing means 55 and a piston rod 56 which abuts the right-hand end 47 of the rod 37. As can be seen from the drawing, the support ring 51 presents an annular shoulder or stop surface 57, effecting movement of the piston 54 to the left in the figure. When desired, the piston 54 can be displaced by supplying a fluid pressure medium, e.g. oil arriving from a conduit 58 via a suitable stuffing box or the like 59, through a central hole 60 in the pressure cylinder 53, the hole being concentric with the rotation center of the winding head.

The winding apparatus described above functions in the following manner:

It is assumed that the mandrel or winding head, i.e. the segments 28, 29 is in an expanded position, and the cylindrical drum 36 being securely "gripped" from the interior, and centered around the axis of rotation of the core head 21. The gripped position of the cylindrical drum 36 is the result of the displacement of rod 37 to the right in the figure by means of the axially acting spring means 44. This position is maintained by means of the said spring means 44 when the core is stationary as well as while the core is rotating. When rotation of the core is stopped and it is desired to remove the cylindrical drum 36 together with the goods coiled thereon from the winding head, a fluid pressure medium, such as oil, is supplied by means of manual operating means through the conduit 58, the stuffing box 59 and hole 60 to the right-hand end surface of the piston 54 in the cylinder 53; the piston 54, as a result, is moved to the left in the figure, and through the intermediary of the piston rod 56 causes the push rod 37 to move to the left in the figure. The compression spring is thereby compressed by the action of the fluid pressure medium on the piston 54 at the same time as the rod 37 moves all segments 28, 29 to the left in the figure. Upon this displacement sequence, the segments will move parallel to one another radially inwardly, thus releasing the grip against the inner surface of the drum 36, whereupon said drum 36 can easily be removed and replaced by a fresh, empty drum.

As is evident from the description it is not necesary in the case of this arrangement to constantly supply a fluid pressure medium to the rotating core, since the strong spring means 44 is used instead. The only time at which it is necessary to supply such a fluid pressure medium is when the winding apparatus is not rotating; thus enabling the sealing arrangement between the pressure cylinder 53 and the stuffing box 59 to be of very simple design, since such wear which occurs, particularly in sealing means, between a stationary and a rotating body when loaded by a pressure medium under considerably working pressure, need not be taken into account.

It is fully evident that when mounting an empty drum 36 on the winding head in its collapsed position the pressure on the piston 54 can be relieved simply by manipulating the means which controls the supply of pressure medium, and draining the pressure oil into a return reservoir. In this manner the piston 54 is caused to move to the right in the figure because the force exerted by the spring means 44 is then predominant.

The spring means indicated by the reference numeral 44 in the figure may be a continuous coil spring presenting appropriate spring characteristics, or also, as more specifically illustrated in the drawing, it may comprise a number of separate but contiguous spring washers. Although only a compression spring has been shown and described for providing the described axial movement and expanding movement, respectively, it is possible by making simple modifications to the design to use, alternatively, a suitable tension spring which acts in the desired direction.

What is claimed is:

1. Expansible mandrel apparatus comprising an elongated core member adapted for being driven in rotation about its longitudinal axis but held against axial movement, said core member having peripheral cam surfaces which are inclined towards said axis, a mandrel including a plurality of segments provided with cam surfaces complementary to and engaging the cam surfaces on said core, the segments being capable of movement axially and radially relative to the axis of the core member to cause expansion and contraction of the mandrel, and axially displaceable rod extending longitudinally through a bore provided in said core member, means coupling the segments to said rod such that the segments undergo axial displacement with the rod, spring means acting on said rod to urge the rod to a position which corresponds to the expanded position of the segments, and selectively operable fluid pressure means for moving the rod axially in a direction opposed to the action of the spring means to contract the mandrel.

2. Apparatus as claimed in claim 1 wherein said selectively operable fluid means comprises a pressure cylinder, a piston in said cylinder including a piston rod for engaging said axially displaceable rod to move the latter axially against the pressure of the spring means when a pressure fluid is supplied to said cylinder.

3. Apparatus as claimed in claim 2 wherein said cylinder is concentric with said core member, said cylinder being provided with an inlet hole for the supply of pressure fluid which is concentric with the axis of rotation of said core member.

4. Apparatus as claimed in claim 1 wherein said core member is provided with a second bore larger than the first, said spring means being engaged in said second bore and acting on said core member and said rod.

5. Apparatus as claimed in claim 3 comprising an abutment member on said rod, said spring means engaging said abutment member.

References Cited

UNITED STATES PATENTS

| | | | |
|---|---|---|---|
| 2,598,398 | 5/1952 | Littell et al. | 242—72.1 |
| 2,705,111 | 3/1955 | Bruestle | 242—72.1 |
| 2,717,128 | 9/1955 | Heizer | 242—72.1 |
| 2,922,593 | 1/1960 | Greenberger | 242—72.1 |

NATHAN LOUIS MINTZ, Primary Examiner